(12) United States Patent  
Clar et al.

(10) Patent No.: US 9,002,593 B2  
(45) Date of Patent: Apr. 7, 2015

(54) SYSTEM AND METHOD FOR RE-DIRECTING A RIPPING PATH

(71) Applicant: Caterpillar Inc., Peoria, IL (US)

(72) Inventors: Jean-Jacques Clar, Edelstein, IL (US); Daniel Stanek, Chillicothe, IL (US); Lance Cowper, Metamora, IL (US); Troy K. Becicka, Sahuarita, AZ (US); Brian G. Funke, Peoria, IL (US); Thandava K. Edara, Peoria, IL (US); Kyle Edwards, Gillette, WY (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/891,865

(22) Filed: May 10, 2013

(65) Prior Publication Data

US 2014/0336881 A1     Nov. 13, 2014

(51) Int. Cl.  
*E02F 9/20*     (2006.01)

(52) U.S. Cl.  
CPC ............. *E02F 9/2045* (2013.01); *E02F 9/2029* (2013.01)

(58) Field of Classification Search  
CPC .......... E02F 9/20; E02F 9/2025; G01C 21/00; G01C 22/00; G05D 1/00; G05D 2201/0202; G06G 7/78; G08G 1/123; H04D 7/185  
USPC ............... 701/50, 116, 36; 171/1, 2  
See application file for complete search history.

(56) References Cited

U.S. PATENT DOCUMENTS

| 5,684,476 | A | 11/1997 | Anderson |
| 6,112,143 | A | 8/2000 | Allen et al. |
| 6,732,458 | B2 | 5/2004 | Kurenuma et al. |
| 7,658,234 | B2 * | 2/2010 | Brandt et al. ..................... 172/7 |
| 8,083,004 | B2 * | 12/2011 | Knight, Jr. ........................ 172/7 |
| 2008/0243345 | A1 * | 10/2008 | Knight ............................ 701/50 |
| 2011/0320085 | A1 * | 12/2011 | Gharsalli et al. ................ 701/26 |
| 2012/0116666 | A1 | 5/2012 | Makela |
| 2012/0136508 | A1 * | 5/2012 | Taylor et al. ..................... 701/2 |

FOREIGN PATENT DOCUMENTS

JP     2011-184886 A     9/2011

* cited by examiner

*Primary Examiner* — Mary Cheung  
*Assistant Examiner* — Brian P Sweeney  
(74) *Attorney, Agent, or Firm* — Leydig, Voit & Mayer, Ltd.

(57) ABSTRACT

A system for re-orienting a machine during a ripping operation includes a position sensing system, a ripper, and a controller. The system stores a ripping path, determines the position of the machine, and compares the position of the machine to the ripping path. A drawbar pull of the machine is determined, compared to a maximum steering drawbar pull, and the ripper is raised if the machine is positioned greater than a predetermined distance from the ripping path and the drawbar pull exceeds the maximum steering drawbar pull. The machine is re-oriented and the ripper lowered relative to the work surface.

19 Claims, 6 Drawing Sheets

SYSTEM AND METHOD FOR RE-DIRECTING A RIPPING PATH

TECHNICAL FIELD

This disclosure relates generally to controlling a machine, and more particularly, to a system and method for re-orienting a machine while performing a ripping operation.

BACKGROUND

Machines such as dozers and motor graders are used to perform a variety of tasks including moving, digging, loosening and carrying different materials at a worksite. For example, these machines may include ground engaging implements used to engage a work surface to move material and/or otherwise alter the work surface at a work site. The machines may operate in an autonomous, semi-autonomous, or manual manner to perform these tasks in response to commands that may be generated as part of a work plan for the machines.

When operating a machine to move material according to a material movement plan, under some circumstances, the machine may not be able to efficiently move the desired material according to the plan. Upon engaging an area with a relatively hard work surface, the machine may be subjected to excessive wear and move along the work surface without moving a significant amount of material. In such case, it may be desirable to utilize a ripper mechanism to break-up or dislodge the hard material to reduce wear on the machine and so that the machine may move the material in an efficient manner. Due to a plurality of factors including the non-homogeneous nature of the work surface, the machine may not always follow the desired ripping path during a ripping operation.

Autonomous or semi-autonomous movement of machines is increasingly desirable for many operations including those related to mining, earthmoving and other industrial activities. Autonomously operated machines may remain consistently productive without regard to a human operator or environmental conditions. In addition, autonomous systems may permit operation in environments that are unsuitable or undesirable for a human operator. However, tasks that typically rely upon the judgment of an experienced operator, such as determining how to efficiently re-direct a machine back to a desired ripping path during a ripping operation may be challenging to perform in an autonomous or semi-autonomous manner.

U.S. Patent Publication No. 2011/0320085 A1 discloses a system for regulating a path of travel of a machine. The system includes a steering system operationally connected to at least one ground engaging traction device and a path generator configured to generate a path along which the machine can travel. The system further includes a path tracker configured to automatically regulate the steering system to position the machine within a predetermined vicinity of an initial point on the generated path and guide the machine along the generated path.

The foregoing background discussion is intended solely to aid the reader. It is not intended to limit the innovations described herein, nor to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

SUMMARY

In one aspect, a system for re-orienting a machine during a ripping operation includes a position sensing system associated with the machine for determining a position of the machine, a ripper on the machine configured to engage a work surface, and a controller. The controller is configured to store a ripping path, determine the position of the machine based upon the position sensing system, and compare the position of the machine to the ripping path. The controller is further configured to determine a drawbar pull of the machine, compare the drawbar pull to a maximum steering drawbar pull, and raise the ripper relative to the work surface if the machine is positioned greater than a predetermined distance from the ripping path and the drawbar pull exceeds the maximum steering drawbar pull. The controller is still further configured to re-orient the machine relative to the ripping path, and lower the ripper relative to the work surface.

In another aspect, a controller-implemented for re-orienting a machine during a ripping operation includes storing a ripping path, determining a position of the machine based upon a position sensing system, and comparing the position of the machine to the ripping path. The method further includes determining a drawbar pull of the machine, comparing the drawbar pull to a maximum steering drawbar pull, and raising a ripper on the machine relative to a work surface if the machine is positioned greater than a predetermined distance from the ripping path and the drawbar pull exceeds the maximum steering drawbar pull. The method still further includes re-orienting the machine relative to the ripping path and lowering the ripper relative to the work surface.

In still another aspect, a machine includes a prime mover, a position sensing system associated with the machine for determining a position of the machine, a ripper on the machine configured to engage a work surface, and a controller. The controller is configured to store a ripping path, determine the position of the machine based upon the position sensing system, and compare the position of the machine to the ripping path. The controller is further configured to determine a drawbar pull of the machine, compare the drawbar pull to a maximum steering drawbar pull, and raise the ripper relative to the work surface if the machine is positioned greater than a predetermined distance from the ripping path and the drawbar pull exceeds the maximum steering drawbar pull. The controller is still further configured to re-orient the machine relative to the ripping path, and lower the ripper relative to the work surface.

DETAILED DESCRIPTION

Figure 1:
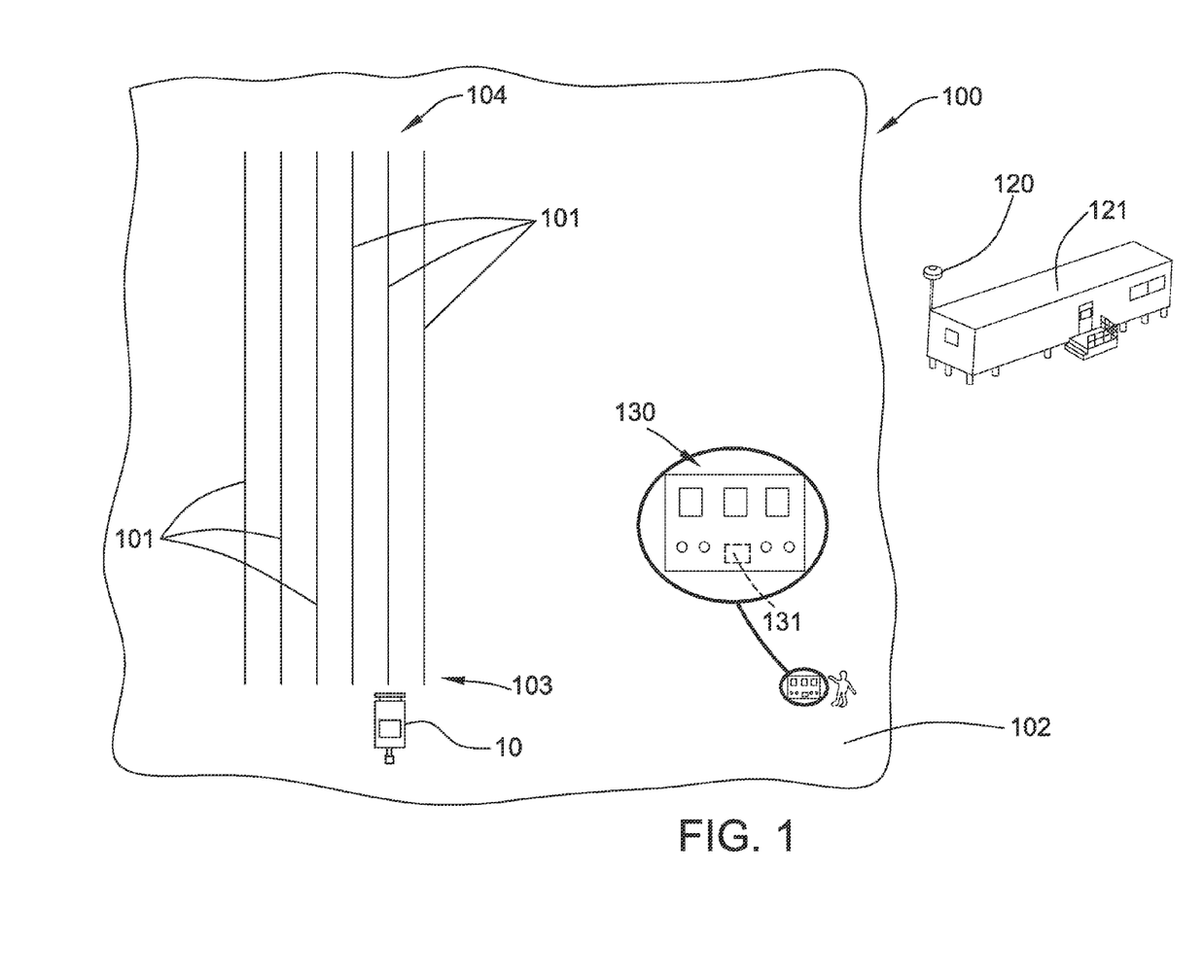
FIG. 1 illustrates a schematic view of an exemplary work site at which a machine incorporating the principles disclosed herein may be used.

FIG. 1 depicts a diagrammatic illustration of a work site 100 at which one or more machines 10 may operate in an autonomous, a semi-autonomous, or a manual manner. Work site 100 may be a portion of a mining site, a landfill, a quarry, a construction site, a roadwork site, a forest, a farm, or any other area in which movement of material is desired. Tasks associated with moving material may include a dozing operation, a grading operation, a leveling operation, a bulk material removal operation, or any other type of operation that results in the alteration of the current topography at work site 100.

A machine 10 such as a dozer may be configured to perform one or more ripping operations along ripping paths 101 at the work site 100 according to a ripping plan. During a ripping operation, a ripper 20 (FIG. 2) engages a work surface 102 to break up hard areas or dislodge embedded articles such as rocks along the ripping path 101 or to mix materials such as chemicals into the work surface. Work surface 102 may take any form and refers to the actual profile or position of the terrain of the work site. In one example, a ripping plan may include, among other things, a plurality of spaced apart ripping paths 101 at work site 100 extending from an initial location 103 to a final location 104. While ripping, machine 10 may move back and forth along a generally linear path following each ripping path 101 between the initial location 103 and the final location 104.

As used herein, a machine 10 operating in an autonomous manner operates automatically based upon information received from various sensors without the need for human operator input. As an example, a haul or load truck that automatically follows a path from one location to another and dumps a load at an end point may be operating autonomously. A machine 10 operating semi-autonomously includes an operator, either within the machine or remotely, who performs some tasks or provides some input and other tasks are performed automatically and may be based upon information received from various sensors. As an example, a load truck that automatically follows a path from one location to another but relies upon an operator command to dump a load may be operating semi-autonomously. In another example of a semi-autonomous operation, an operator may dump a bucket from an excavator in a load truck and a controller may automatically return the bucket to a position to perform another digging operation. A machine 10 being operated manually is one in which an operator is controlling all or essentially all of the functions of the machine. A machine 10 may be operated remotely by an operator (i.e., remote control) in either a manual or semi-autonomous manner.

Figure 2:
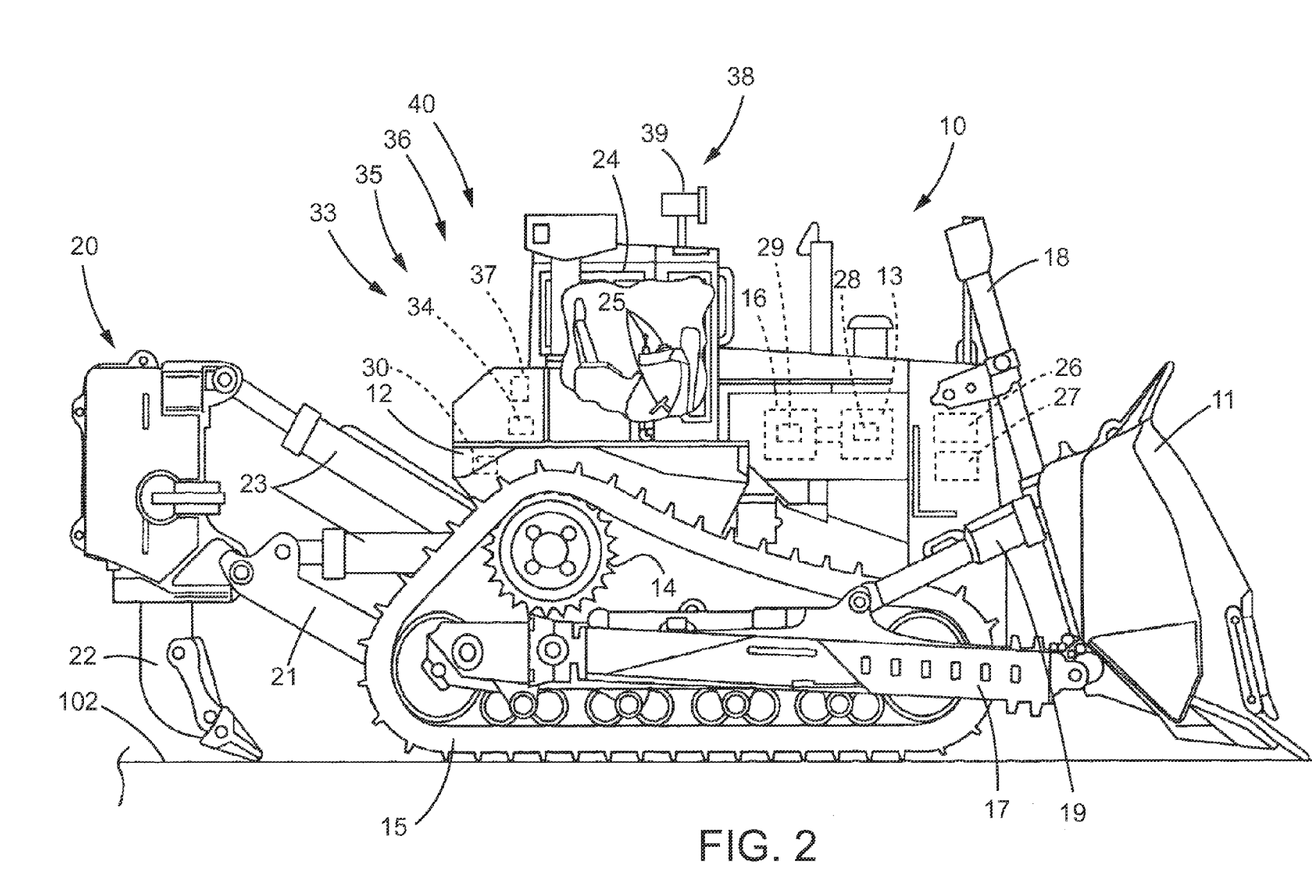
FIG. 2 illustrates a diagrammatic illustration of a machine in accordance with the disclosure.

FIG. 2 shows a diagrammatic illustration of a machine 10 such as a dozer with a work implement or blade 11 for pushing material. The machine 10 includes a frame 12 and a prime mover such as an engine 13. A ground-engaging drive mechanism such as a track 15 may be driven by a drive sprocket 14 on opposite sides of machine 10 to propel the machine. Although machine 10 is shown in a "track-type" configuration, other configurations, such as a wheeled configuration, may be used.

The systems and methods of the disclosure may be used with any machine propulsion and drivetrain mechanisms applicable in the art including hydrostatic, electric, or mechanical drives. In one embodiment, machine 10 may be configured with a type of mechanical drive system so that engine 13 drives a torque converter 16 which in turn drives a transmission (not shown). The transmission may be operatively connected to the drive sprockets 14 and the tracks 15. Operation of the engine 13 and transmission, and thus the drive sprockets 14 and tracks 15, may be controlled by a control system 35 including a controller 36. Other types of prime movers and drive systems are contemplated.

Machine 10 may include a first ground-engaging work implement such as blade 11 pivotally connected to frame 12 by arms 17 on each side of machine 10. First hydraulic cylinder 18 coupled to frame 12 supports blade 11 in the vertical direction, and allows blade 11 to move up and down vertically from the point of view of FIG. 2. Second hydraulic cylinders 19 on each side of machine 10 allow the pitch angle of blade tip to change relative to a centerline of the machine.

Machine 10 may include a second ground-engaging work implement such as ripper 20 pivotally connected to frame 12. The ripper 20 may include a ripper linkage 21 with one or more ground-engaging ripper shanks 22 for engaging and digging into work surface 102. One or more actuators or hydraulic cylinders 23 may be provided to control the position of the ripper linkage 21.

Machine 10 may include a cab 24 that an operator may physically occupy and provide input to control the machine. Cab 24 may include one or more input devices 25 through which the operator may issue commands to control the propulsion system and steering system of the machine as well as operate various implements associated with the machine.

Machine 10 may be equipped with a plurality of sensors that provide data indicative (directly or indirectly) of various operating parameters of the machine. The term "sensor" is meant to be used in its broadest sense to include one or more sensors and related components that may be associated with the machine 10 and that may cooperate to sense various functions, operations, and operating characteristics of the machine.

One or more movement sensors may be positioned on the machine 10 for sensing movement of the machine 10 and generating movement signals indicative of movement of the machine. A pitch rate sensor 26 (e.g., a gyroscope) may be provided or mounted on the machine 10, on the blade 11, or on an implement frame member to which the blade is mounted. The pitch rate sensor 26 may be used to provide a pitch rate signal indicative of a measured pitch rate of the machine 10 or the blade 11, depending upon the location of the sensor. The pitch rate sensor 26 may be a "stand-alone" sensor or part of a multi-function sensor such as an inertial measurement unit that also measures the acceleration of the machine 10 along various axes. The pitch rate measured by the pitch rate sensor 26 is indicative of the rate of change of the pitch angle of the sensor.

An acceleration sensor 27 (e.g., a 3-axis accelerometer) may also be provided as a separate component or part of a multi-function sensor. The acceleration sensor 27 may be used to provide an acceleration signal indicative of acceleration of the machine 10 relative to a gravity reference. If the acceleration sensor 27 is not part of a multi-function sensor, it may be positioned adjacent to the pitch rate sensor 26 or at another location on machine 10.

An engine speed sensor 28 may be operatively associated with engine 13 and utilized to generate a signal indicative of the speed or output of the engine 13. A torque converter speed sensor 29 may be operatively associated with torque converter 16 and utilized to monitor the output speed of the torque converter 16. During operation of the machine 10, the output speed of the engine 13, the output speed of the torque converter 16 together with the machine gear ratio may be used to determine the drawbar pull being generated.

A track speed sensor 30 may be operatively associated with the tracks 15 and utilized to determine, directly or indirectly, the speed of the tracks. If desired, a track speed sensor 30 may be associated with each track 15. In one embodiment, the track speed sensor 30 may embody a drive speed measurement sensor in the form of a magnetic sensor that measures the rate at which the drive wheel 14 is rotated. The track speed of the tracks 15 together with ground speed of the machine 10 may be used to calculate the amount that the tracks 15 are slipping relative to the work surface 102.

A position sensing system 33, as shown generally by an arrow in FIG. 2 indicating association with the machine 10, may include a position sensor 34 operative to sense a position of the machine relative to the work site 100. In one example, the position sensor 34 may include one or more sensors that interact with a positioning system such as a global navigation satellite system or a global positioning system to operate as a position sensor. The position sensor 34 may be used to determine the position of the machine 10 within work site 100 as well as the orientation of the machine such as its heading, pitch and roll. In other examples, the position sensor 34 may be an odometer or another wheel rotation sensing sensor, a perception based system, or may use other systems such as lasers, sonar, or radar to determine the position of machine 10. In still another example, a separate heading sensor system (not shown) may be provided to determine a heading of the machine 10.

The position sensor 34 may also be used to determine a ground speed of machine 10. Other sensors or a dedicated ground speed sensor may be used to determine the ground speed of the machine 10. Still further, the position sensor may be used to determine the inclination of the machine 10. In other embodiments, a pitch sensor or inclinometer (not shown) may be mounted on or associated with the machine 10.

Machine 10 may be controlled by a control system 35 as shown generally by an arrow in FIG. 2 indicating association with the machine 10. The control system 35 may include an electronic control module or controller 36. The controller 36 may receive input command signals from a wireless network system 120 (FIG. 1), remote control input command signals from an operator using a remote control unit or remote control console 130 to operate machine 10 remotely, or operator input command signals from an operator operating the machine 10 from within cab 24. The controller 36 may control the operation of various aspects of the machine 10 including the drivetrain as well as the hydraulic systems and other systems that operate the work implements. The control system 35 may utilize various input devices to control the machine 10 and one or more sensors to provide data and input signals representative of various operating parameters of the machine 10 and the environment of the work site 100.

The controller 36 may be an electronic controller that operates in a logical fashion to perform operations, execute control algorithms, store and retrieve data and other desired operations. The controller 36 may include or access memory, secondary storage devices, processors, and any other components for running an application. The memory and secondary storage devices may be in the form of read-only memory (ROM) or random access memory (RAM) or integrated circuitry that is accessible by the controller. Various other circuits may be associated with the controller 36 such as power supply circuitry, signal conditioning circuitry, driver circuitry, and other types of circuitry.

The controller 36 may be a single controller or may include more than one controller disposed to control various functions and/or features of the machine 10. The term "controller" is meant to be used in its broadest sense to include one or more controllers and/or microprocessors that may be associated with the machine 10 and that may cooperate in controlling various functions and operations of the machine. The functionality of the controller 36 may be implemented in hardware and/or software without regard to the functionality. The controller 36 may rely on one or more data maps relating to the operating conditions and the operating environment of the machine 10 and the work site 100 that may be stored in the memory of controller. Each of these data maps may include a collection of data in the form of tables, graphs, and/or equations.

The control system 35 may be located on the machine 10 and may also include components located remotely from the machine such as at a command center 121 (FIG. 1) or at the remote control console 130. The functionality of control system 35 may be distributed so that certain functions are performed at machine 10 and other functions are performed remotely. In such case, the control system 35 may include a communications system such as wireless network system 120 for transmitting signals between the machine 10 and a system located remote from the machine. For example, remote aspects of control system 35 may provide generalized commands or information over wireless network system 120 to the machine 10 that the portions of control system 35 on the machine utilize to generate specific commands to operate the various systems of machine 10. In another embodiment, remote control console 130 positioned remote from the machine 10 may provide some or all of the specific commands that are then transmitted by the wireless network system 120 to systems of the machine.

Machine 10 may be configured to be operated autonomously, semi-autonomously, or manually. When operating semi-autonomously or manually, the machine may be operated by remote control and/or by an operator physically located within the cab 24. If the machine 10 is configured to operate via a remote control system, a visual image system 38 such as a camera system may be provided on the machine 10 for generating visual images indicative of a point of view relative to the machine 10. The visual image system 38 may include a plurality of visual image sensors such as cameras 39 for generating visual image signals. The visual image signals may be transmitted wirelessly to a system remote from machine 10.

Still further, if the machine is being operated via remote control, a portion of the control system 35 may be located at the remote control unit or remote control console 130. Machine 10 may include a machine controller 37 and remote control console 130 may include a console controller 131. The machine controller 37 and the console controller 131 may be components of controller 36.

Figure 3:
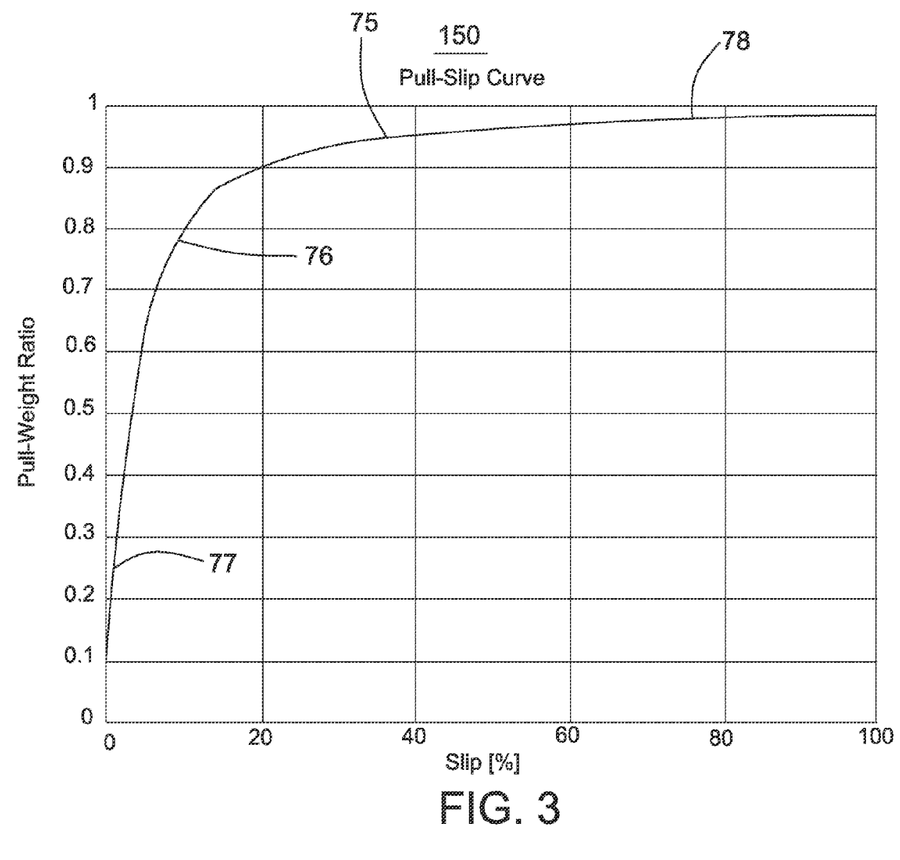
FIG. 3 illustrates a graph of an exemplary pull-slip curve.

When propelling the machine 10, the propulsive force provided by the ground-engaging drive mechanism such as tracks 15 is limited by the resistive force of the material of the work surface 102. More specifically, if too much force is provided through tracks 15, the tracks will slip excessively and the machine 10 will operate in an inefficient manner. To maximize efficiency, it is often desirable to operate a machine 10 generally at the knee of an applicable pull-slip curve. An example of a pull-slip curve 75 is depicted in FIG. 3 having a knee 76. The pull-slip curve depicts a ratio of the drawbar pull and weight of the machine 10 versus track slip. Operating below the knee 76 such as at 77 will result in minimal slip but a relatively small drawbar pull and thus a relatively small amount of work being performed. Operating with a significant amount of slip such at 78 is relatively inefficient as the high level of slip permits only a small amount of movement of the machine 10.

During a ripping operation, the speed of the machine 10 and the height of the ripper 20 relative to the work surface 102 may be set to maximize productivity while minimizing wear to the machine. In doing so, the controller 36 may optimize propulsion by operating the machine 10 near the knee 76 of the pull-slip curve 75. To do so, the controller 36 may determine the drawbar pull based upon the output speed of the engine 13 and the output speed of the torque converter 16. The slip of the tracks 15 may be determined based upon the ground speed of the machine 10 and the speed of the tracks. The controller 36 may then control the speed of the tracks 15 and the height of the ripper 20 relative to the work surface 102 to maintain operation near the knee 76 of the pull-slip curve 75.

In order to perform the maximum amount of work, the ripper 20 may be positioned to extend a maximum distance or depth into the work surface 102 while the machine 10 operates generally at the knee 76 of the pull-slip curve 75. In other words, the ripper 20 may be positioned relative to the work surface 102 so as to perform a maximum amount of ripping while the ground-engaging drive mechanisms such as tracks 15 move along the work surface in an optimum manner with a desirable amount of slip. If the ripper 20 is too high relative to the work surface 102, the machine 10 may efficiently move along the work surface but will not optimally perform the ripping operation. On the other hand, if the ripper 20 is too low or deep in the work surface 102, the tracks 15 may slip excessively causing inefficient movement of the machine which results in additional fuel usage and additional wear on the machine 10.

It should be noted that the pull-slip curve 75 of FIG. 3 is exemplary and the specific shape and position may vary for each machine 10 and may also vary from day-to-day depending upon other factors including the characteristics of the machine such as the wear or condition of the tracks 15, the characteristics of the work surface 102 such as the type and cohesion of the material and its moisture content, and the conditions of the work site 100. Accordingly, it may be desirable to estimate the coefficient of traction relative to the machine 10 and the work surface 102 to assist the controller 36 in operating adjacent the knee 76 of the pull-slip curve 75.

Figure 4:
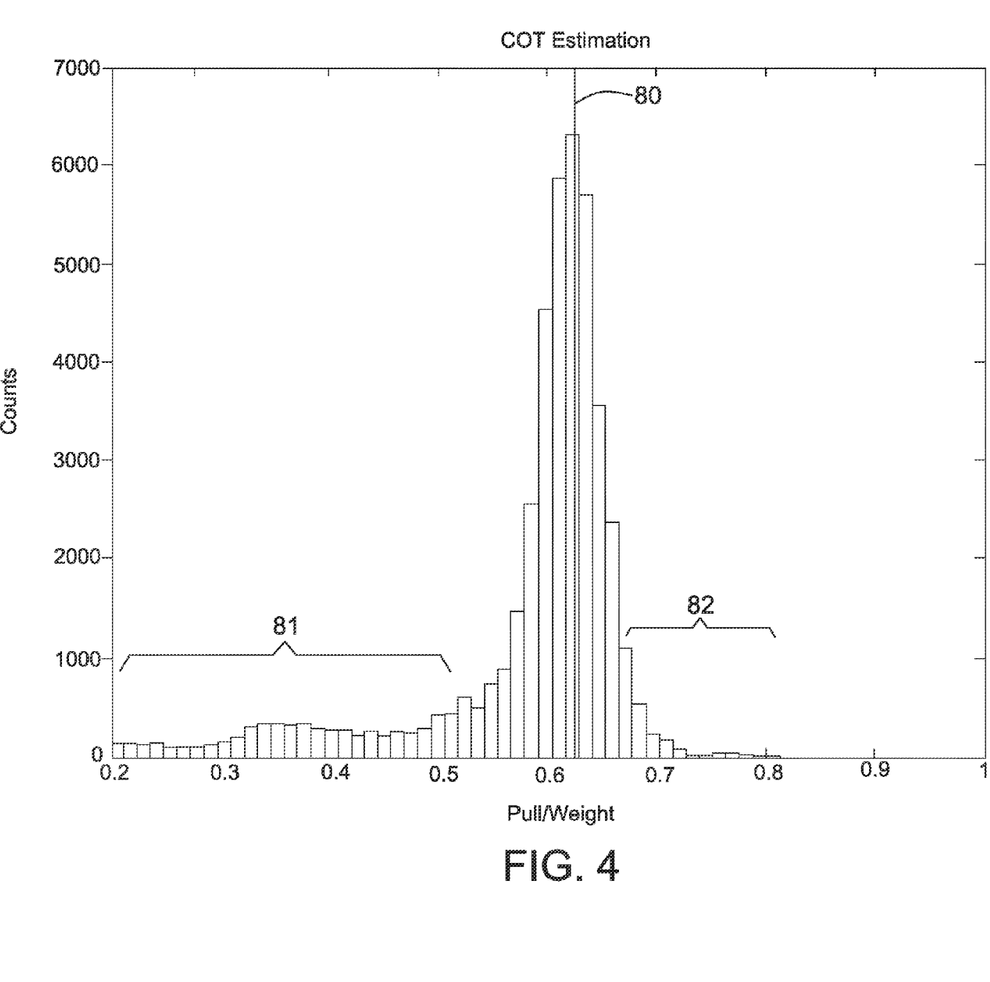
FIG. 4 illustrates a histogram of estimates of a exemplary data used to determine a coefficient of traction.

In one example, referring to FIG. 4, an estimate of the coefficient of traction 80 may be determined by fully loading the machine 10 and analyzing a plurality of data corresponding to slip of the tracks 15. The estimate of the coefficient of traction 80 may be determined once a threshold number of data points have been determined and the standard deviation is less than a desired value. In doing so, lower data points 81 may be discounted as those may have occurred at relatively soft areas of the work surface 102 or while machine 10 was not fully loaded. Higher data points 82 may be discounted as they may have occurred at relatively hard areas on the work surface 102 or if the operation of the machine 10 resulted in the machine being pushed into the ground to generate an apparent increase in weight of the machine such as during steering, braking, or operation of a decelerator pedal (not shown). Other manners of estimating or determining the coefficient of traction are contemplated.

In some instances while performing a ripping operation, the machine 10 may not follow the designated ripping path 101. This may be due to non-uniformity in the material of the work surface 102 along the ripping path 101, the ripper 20 following a seam in the work surface 102 or a path that has already been ripped, or other causes that re-direct machine 10. If the machine 10 does not follow the desired ripping path 101, there may be insufficient traction to re-direct or re-orient the machine back to the ripping path without adjusting the position of the ripper 20. Further, in some instances in which sufficient traction exists, re-orienting the machine 10 with the ripper 20 fully engaging the work surface 102 may damage the ripper.

Insufficient traction may occur when attempting to turn the machine 10 while the machine is operating near the knee 76 of the pull-slip curve 75. While turning, power propelling the machine 10 forward is reduced to the inside track 15 (i.e., the track about or around which the machine is turning). By doing so, propulsion by the inner track is eliminated or reduced while power is maintained to the outer track thus causing the inner and outer tracks to move at different speeds which causes machine 10 to turn. As a result of the reduction in propulsion by the inner track, the drawbar pull of the machine 10 is reduced. Attempting to turn the machine 10 without raising the ripper 20 may result in additional slippage of the track(s) 15. In some instances, the slippage may result in the machine 10 stopping and being unable to turn. As a result, it may be desirable to raise the ripper 20 relative to work surface 102 to reduce track slip and to permit re-orienting or re-directing the machine 10.

In some instances, it may be desirable to raise the ripper 20 above the work surface 102 to eliminate any load created by the ripper and permit re-orienting of the machine 10. However, such operation may require stopping forward movement of the machine 10 during the process of raising the ripper 20, re-orienting the machine, and lowering the ripper back into engagement with the work surface 102. During such processes, no productive work is being performed.

To increase productivity, a steering control system 40 may be provided as part of the control system 35 to re-orient the machine using track steering while the ripper 20 remains in engagement with the work surface 102. In doing so, the steering control system 40 may raise the ripper 20 to a height necessary to permit steering or re-orienting of the machine without substantially exceeding the traction limits of the tracks 15 relative to the work surface 102. This will maintain efficient operation (i.e., operation generally adjacent the knee 76 of the pull-slip curve 75 of FIG. 3) while continuing to move machine 10 forward and thus continuing the ripping process.

The steering control system 40 may determine a maximum steering drawbar pull at which the machine 10 may continue the ripping process while simultaneously re-orienting the machine 10. The maximum steering drawbar pull is a reduced value (as compared to the maximum drawbar pull of the machine when operating in a straight line) that compensates for the loss in traction due to the decrease in propulsion from or braking of the inner track. The steering control system 40 may utilize an estimate of the coefficient of traction while setting the maximum steering drawbar pull so that the maximum steering drawbar pull also is based upon the operating conditions encountered by machine 10. In doing so, an initial estimate of the coefficient of traction may be pre-set within the controller 36 or may be entered by an operator, management personnel, or other personnel based upon the operating conditions at the work site 100. In some instances, the initial estimate of the coefficient of traction may be replaced by an estimate of the coefficient of traction based upon empirical data gathered as the machine 10 has been operating at the work site 100.

Figure 5:
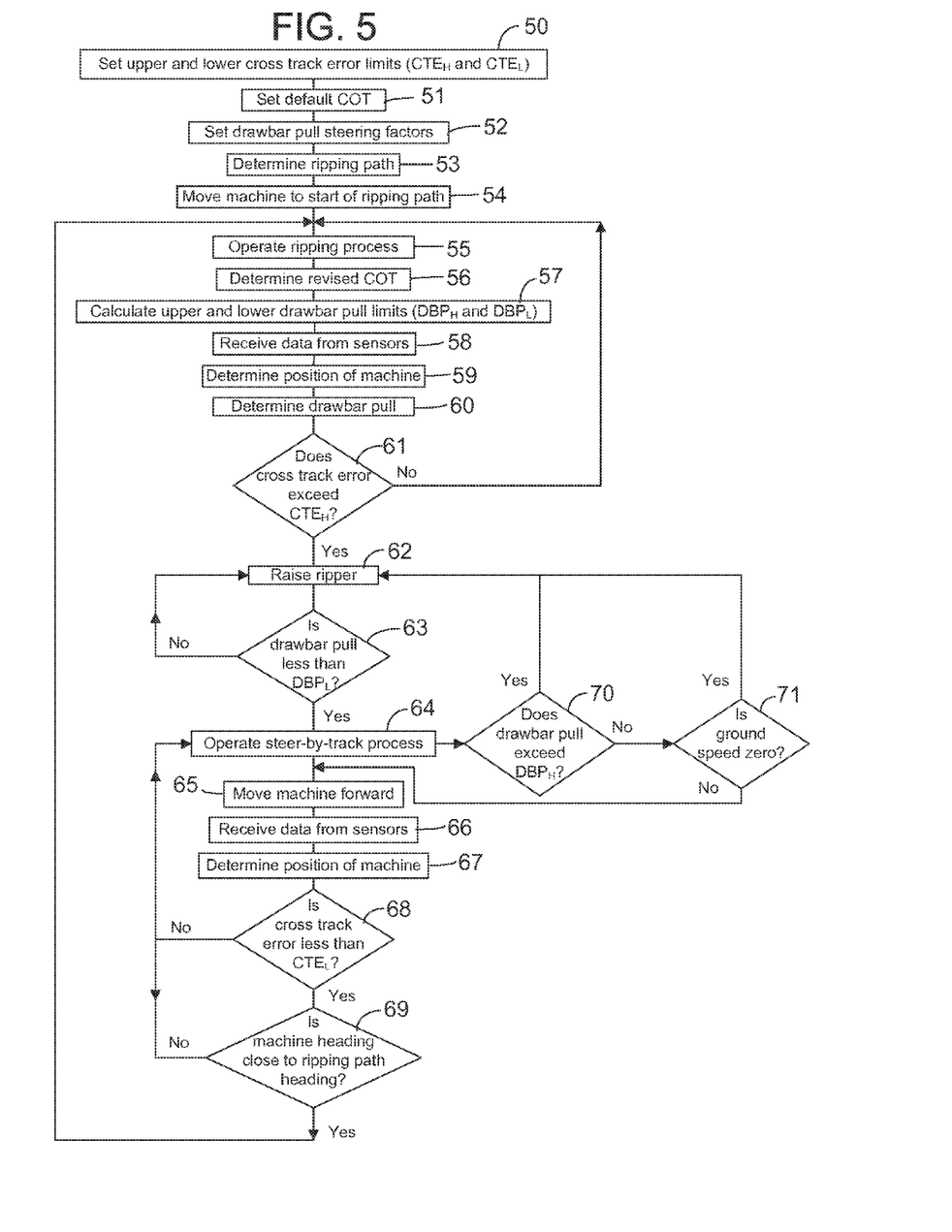
FIG. 5 illustrates a flowchart of a process for re-directing the orientation of the machine during a ripping operation.
Figure 6:
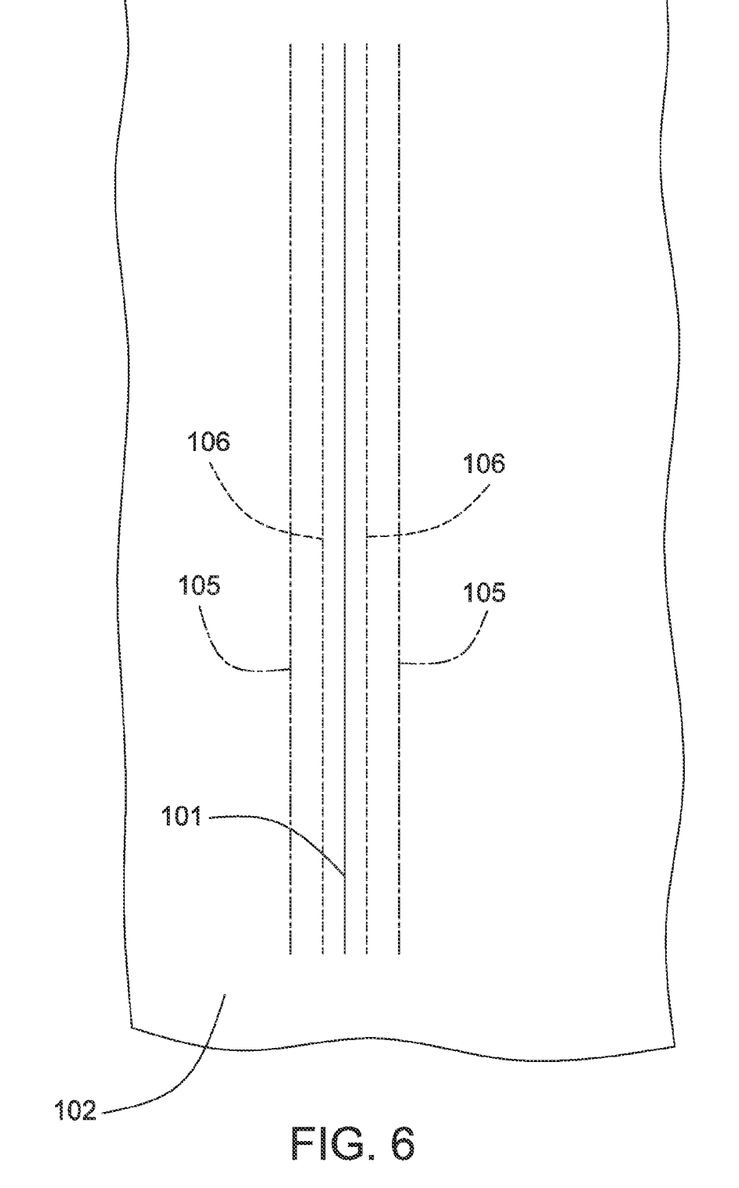
FIG. 6 illustrates an enlarged portion of a ripping path of FIG. 1.

Operation of a portion of the ripping process and the steering control system 40 is depicted in the flowchart in FIG. 5. At stage 50, the upper and lower cross track error limits ($CTE_H$ and $CTE_L$) may be set to define when the steering control system 40 will correct the machine's path to remain as close as desired to the ripping path 101. In order to maximize efficiency, it may be desirable to set upper and lower limits to define when to start and stop the operation of steering control system 40. More specifically, an example of a portion of a ripping path 101 is depicted in FIG. 6. The upper cross track error limit 105 defines an outer boundary that sets the distance from the ripping path 101 at which the steering control system 40 may begin to operate. In other words, once the machine 10 passes the upper cross track error limit 105, the steering control system 40 may begin to operate. The lower cross track error limit 106 defines an inner boundary that sets the distance from the ripping path 101 at which the steering control system 40 may cease to operate. More specifically, once the steering control system 40 is operating, the system may continue to operate until the machine 10 is back within the lower cross track error limit 106.

At stage 51, an initial coefficient of traction may be set as a predetermined value or ratio. The initial coefficient of traction may be pre-programmed into the controller 36 or may be set by an operator, management personnel, or other personnel based upon expected operating conditions including wear of the track 15 and observed operating conditions at the work site 100.

Upper and lower steering traction factors may be set at stage 52. Since the machine 10 may not be able to pull with as great a force when steering or re-orienting the machine, one or more steering traction factors may be used by the steering control system 40 to maintain the drawbar pull at the tracks 15 below a desired level. If the machine 10 is ripping in a relatively efficient manner, upon slowing the inner track to re-orient the machine, the drawbar pull of the machine will be reduced. The lower steering traction factor may be set to limit the amount of slip of the tracks 15 to maintain operation below the traction limit of the work surface and thus maintain operation generally at the knee 76 of the pull-slip curve 75. In other words, the lower steering traction factor may be used by the steering control system 40 to reduce the drawbar pull to maintain the operation below the traction limit and maintain slip between the tracks 15 and the work surface 102 at a desired rate to optimize performance. The upper steering traction factor may be used for hysteresis to add stability to the process and improve the efficiency of the steering control system 40. It is believed that the lower and upper steering traction factors may fall within a range of between approximately 0.3 and 0.65. In one example, the upper steering traction factor may be set at 0.5 and lower steering traction factor may be set at 0.35.

Each of the values identified at stages 50-52 may be set as defaults within the controller or set by an operator, management personnel, or other personnel, as desired.

At stage 53, a ripping path 101 may be set or determined. The ripping path 101 may be set by a human, such as an operator or management personnel, or automatically, such as by planning software. After the ripping path 101 has been set, the machine 10 may be moved to the beginning or start of the ripping path 101 at stage 54. An automated ripping process may begin at stage 55 by moving the ripper 20 into engagement with the work surface 102 and moving the machine 10 along the ripping path 101.

If desired, a revised coefficient of traction may be determined at stage 56. A revised coefficient of traction may be determined by empirical data as described above with respect to FIG. 4.

Either based upon the initial or default coefficient of traction set at stage 51 or after a revised coefficient of traction has been determined at stage 56, a maximum steering drawbar pull may be calculated. In some instances, the maximum steering drawbar pull may be broken into two separate components to define an operating range for the steering control system 40. The range may be defined by calculating upper and lower drawbar pull limits ($DBP_H$ and $DBP_L$) at stage 57. In one example, the upper and lower drawbar pull limits may both be less than the maximum steering drawbar pull. In another example, the lower drawbar pull limit may be less than the maximum steering drawbar pull and the upper drawbar pull limit may be generally equal to or slightly less than the maximum steering drawbar pull.

The lower drawbar pull limit may be calculated by multiplying the coefficient of traction, the lower steering fraction factor, and the weight of the machine 10. The steering control system 40 uses the lower drawbar pull limit to set a permitted amount of slip of the tracks 15 to maintain operation below the traction limit of the work surface 102. As described below, the lower drawbar pull limit may be used by the steering control system 40 to adjust the height of the ripper 20 and control the operation of the machine 10.

The upper drawbar pull limit may be calculated by multiplying the coefficient of traction, the upper steering fraction factor, and the weight of the machine 10. The upper drawbar pull limit may be used for hysteresis, to permit the steering control system 40 to anticipate the machine 10 slowing down due to reduced traction and permit corrective action (e.g., raising the ripper), and to add stability to the operation of the steering control system.

As the machine moves along the ripping path, the controller 36 may receive at stage 58 data from various sensors including the track speed sensor 30 and the position sensor 34. At stage 59, the controller 36 may determine the position of the machine 10.

The controller 36 may determine the drawbar pull at stage 60. In doing so, the controller 36 may determine the output speed of the engine 13 and compare it to the output speed of the torque converter 16. Based upon the output speed of the engine 13, the output speed of the torque converter 16, and the machine gear ratio, the controller 36 may determine the drawbar pull.

At decision stage 61, the controller 36 may compare the actual position of the machine 10 to the ripping path 101 to determine the distance of the machine from the ripping path. If the distance of the machine 10 from the ripping path 101 (i.e., the cross track error) is less than the upper cross track error limit 105, the machine may continue to operate in accordance with the ripping process at stage 55.

If the cross track error is greater than the upper cross track error limit 105, the steering control system 40 may determine that a steering correction or re-orientation of the machine 10 is necessary. The controller 36 may raise at stage 62 the ripper 20 a predetermined distance relative to the work surface 102. In some instances, the controller 36 may not initially raise the ripper 20. At decision stage 63, the controller 36 may determine whether the drawbar pull is less than the lower drawbar pull limit. If the drawbar pull is not less than the lower drawbar pull limit, the controller 36 repeats the process of raising the ripper 20 at stage 62 and comparing the drawbar pull to the lower drawbar pull limit at decision stage 63.

Once the drawbar pull is less than the lower drawbar pull limit, the controller 36 may begin to re-orient the machine 10 with a steer-by-track process at stage 64. In doing so, if the machine 10 includes a clutch for each track 15, the controller 36 may provide commands to slow the operation of the inner track while power is maintained to the outer track. This action causes the machine 10 to turn due to the difference in speed between inner track and the outer track. In one example, the clutch (not shown) associated with the inner track may be partially disengaged to reduce the power to the inner track. In another example, the clutch associated with the inner track may be fully disengaged when turning. Still further, when the clutch associated with the inner track is either partially or fully disengaged, a brake (not shown) may be applied to the inner track to increase the difference in speed between the inner track and the outer track. In the examples listed above, the speed at which the machine 10 will turn will generally increase from the example in which the clutch associated with the inner track is partially disengaged to the example in which the clutch is fully disengaged and the brake is applied to the inner track.

In other types of drive systems, a difference in speed between the inner track and the outer track may be achieved in different manners. For example, in a hydrostatic drive, a hydraulic drive motor (not shown) may be associated with each track 15. The flow rate to the drive motor associated with the inner track may be reduced. As a result of the difference between the flow rates to the drive motors associated with the inner track and the outer track, the inner track will move more slowly than the outer track which will result in turning of the machine 10. In another example, a differential steering control system may be used in which a differential motor (not shown) causes the inner track and outer track to move at different rates to carry out the steering process.

At stage 65, the machine 10 may move forward and the controller 36 may receive at stage 66 data from the position sensor 34. The controller 36 may determine at stage 67 the position of the machine 10 based upon the data received from the position sensor 34. At decision stage 68, the controller 36 may compare the position of the machine 10 to the ripping path 101 to determine the distance of the machine from the ripping path. If the cross track error is less than the lower cross track error limit 106, the controller 36 may determine whether the heading of the machine 10 is within a predetermined range of the heading of the ripping path 101. If the heading of the machine 10 is within the predetermined range, the steering control system 40 may cease operation and the ripping process may be resumed at stage 55.

If the cross track error is not less than the lower cross track error limit 106 at stage 68 or the machine heading is not close enough to the ripping path heading at stage 69, the steer-by-track process is repeated at stage 64. At decision stage 70, the controller 36 may determine whether the drawbar pull exceeds the upper drawbar pull limit. If the drawbar pull exceeds the upper drawbar pull limit, the machine may not be moving in an efficient manner and the ripper 20 may be raised at stage 62 and the process of stages 63-69 repeated. In doing so, the ripper 20 may be raised until the drawbar pull is less than the lower drawbar pull limit. If the drawbar pull does not exceed the upper drawbar pull limit at decision stage 70, the controller may utilize the position sensing system 33 or a ground speed sensor (not shown) to determine at decision stage 71 whether the machine is stuck or has zero ground speed. If the ground speed of the machine 10 is zero, the ripper 20 may be raised at stage 62 and stages 63-69 repeated. If the drawbar pull does not exceed the upper drawbar pull limit at decision stage 70 and the ground speed of the machine is not zero at decision stage 71, the steering control system 40 may be re-orienting the machine 10 in a relatively efficient manner and the process of stages 65-69 repeated.

In some instances, the steering control system 40 may operate through the process of stages 64-69 but the machine 10 is unable to return to the ripping path 101 (i.e., decision stages 68 or 69 have not been satisfied). This may be due to the ripper 20 engaging a seam in the work surface 102 or due to some other cause. In such case, after the machine 10 has traveled a predetermined distance without returning to the ripping path 101, the steering control system 40 may be configured to deviate from the process according to the flow chart of FIG. 5. In one example, the predetermined distance may be set at 100 feet but other distances are contemplated and the exact distance may be set based upon various factors. In one instance, if the machine 10 has not returned to the ripping path 101 after traveling the predetermined distance, the steering control system 40 may be configured to raise the ripper 20 above the work surface 102 and move the machine 10 rearwardly at an angle towards the ripping path 101 to generally realign the machine with the ripping path 101. In another instance, the steering control system 40 may be configured to raise the ripper 20 above the work surface 102 and move the machine 10 forwardly at an angle towards the ripping path 101 to generally realign the machine with the ripping path. In still other instances, the steering control system 40 may be configured to raise the ripper 20 above the work surface 102 and generate a revised ripping path. In any case, the ripping process may then be re-engaged to continue the ripping operation at stage 55.

In an alternate process, rather than re-directing the machine 10 and comparing its position and heading to the lower cross track error 106 and the heading of the ripping path at stages 68-69, the steering control system 40 may generate a new or revised ripping path and direct the machine along the revised ripping path. More specifically, the steering control system 40 may generate a revised ripping path and then use the revised ripping path as a target along which the steering control system re-routes the machine 10. As such, decision stage 68 may be modified so that the steering control system 40 compares the position of the machine 10 to the revised ripping path. Decision stage 69 may be modified to compare the machine heading to that of the revised ripping path.

INDUSTRIAL APPLICABILITY

The industrial applicability of the system described herein will be readily appreciated from the forgoing discussion. The foregoing discussion is applicable to autonomously or semi-autonomously operated machines 10 having rippers 20 that engage the work surface 102 along a ripping path 101. Such system may be used at a mining site, a landfill, a quarry, a construction site, a roadwork site, or any other area in which movement or mixing of materials is desired.

When ripping a work surface 102 in an automated manner, the machine 10 may not follow a designated ripping path 101. This may be due to non-uniformity in the material of the work surface 102 along the ripping path, the ripper 20 following a seam in the work surface or a path that has already been ripped, or other causes that re-direct machine 10. Attempts to re-direct the machine 10 along the ripping path 101 may fail as there may be insufficient fraction without adjusting the depth of the ripper 20 relative to the work surface.

A steering control system 40 may be provided to raise the ripper 20 relative to the work surface 102 to an appropriate height to permit the ripping operation to continue to some extent while the machine 10 is being re-directed back to the ripping path 101. In doing so, the steering control system 40 may compare the measured or calculated drawbar pull of the machine 10 with an estimate of the maximum steering drawbar pull that may be provided without causing the ground-engaging drive mechanisms such as tracks 15 to slip excessively. In doing so, the steering control system 40 may use an estimate of a coefficient of traction as well as a steering reduction or steering traction factor to increase the efficiency of the steering control system.

The steering control system 40 may raise the ripper 20 to the height necessary to permit steering or re-orienting of the machine without substantially exceeding the traction limits of the tracks 15 relative to the work surface 102. This will maintain efficient operation while continuing to move machine 10 forward and thus continuing the ripping process.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The invention claimed is:

1. A system for re-orienting a machine during a ripping operation, comprising:
   a position sensing system associated with the machine for generating data indicative of a position of the machine;
   a pair of ground engaging tracks for propelling the machine;
   a ripper on the machine configured to engage a work surface; and
   a controller configured to:
      store a ripping path;
      determine the position of the machine based upon the data from the position sensing system;
      compare the position of the machine to the ripping path;
      determine a drawbar pull of the machine;
      determine a maximum steering drawbar pull based upon a steering traction factor, the steering traction factor being within a range of approximately 0.3 to 0.65, the maximum steering drawbar pull being utilized when the machine is being re-oriented relative to the ripping path and being less than a maximum drawbar pull utilized when the machine is being steered in a straight line along the ripping path;
      compare the drawbar pull to the maximum steering drawbar pull;
      raise the ripper relative to the work surface if the machine is positioned greater than a predetermined distance from the ripping path and the drawbar pull exceeds the maximum steering drawbar pull;
      re-orient the machine relative to the ripping path by propelling the pair of ground engaging tracks at different speeds; and
      lower the ripper relative to the work surface.

2. The system of claim 1, wherein the controller is further configured to compare the drawbar pull of the machine to a lower drawbar pull limit and raising the ripper relative to the work surface until the drawbar pull reaches the lower drawbar pull limit.

3. The system of claim 1, wherein the controller is further configured to move the machine towards the ripping path before lowering the ripper relative to the work surface.

4. The system of claim 3, further including a heading sensor system configured to determine a heading of the machine and the controller is further configured to determine a heading of the machine based upon the heading sensor system and to re-engage an automated ripping process if the machine is within a second predetermined distance from the ripping path and the heading is aligned with the ripping path.

5. The system of claim 4, wherein the second predetermined distance is less than the predetermined distance.

6. The system of claim 1, wherein the controller is configured to raise the ripper and move the machine rearwardly relative to the ripping path upon the machine moving a predetermined distance forward relative to the ripping path and without reaching the ripping path.

7. The system of claim 1, wherein the controller is further configured to determine a revised ripping path and the machine is re-oriented to follow the revised ripping path.

8. The system of claim 1, wherein the controller is further configured to determine the maximum steering drawbar pull based upon a coefficient of traction of the work surface.

9. The system of claim 8, wherein the controller is configured to determine the coefficient of traction of the work surface based upon empirical data in the controller gathered during operation of the machine.

10. The system of claim 1, wherein the controller is configured to re-orient the machine by changing relative speeds of ground-engaging drive mechanisms on opposite sides of the machine.

11. A controller-implemented method for re-orienting a machine during a ripping operation, comprising:
   storing a ripping path;
   determining a position of the machine based upon data from a position sensing system;
   comparing the position of the machine to the ripping path;
   determining a drawbar pull of the machine;
   determining a maximum steering drawbar pull based upon a steering traction factor, the steering traction factor being within a range of approximately 0.3 to 0.65, the maximum steering drawbar pull being utilized when the machine is being re-oriented relative to the ripping path and being less than a maximum drawbar pull utilized when the machine is being steered in a straight line along the ripping path;
   comparing the drawbar pull to a maximum steering drawbar pull;
   raising a ripper on the machine relative to a work surface if the machine is positioned greater than a predetermined distance from the ripping path and the drawbar pull exceeds the maximum steering drawbar pull;
   re-orienting the machine relative to the ripping path by propelling a pair of ground engaging tracks at different speeds; and
   lowering the ripper relative to the work surface.

12. The method of claim 11, further including comparing the drawbar pull of the machine to a lower drawbar pull limit and raising of the ripper relative to the work surface until the drawbar pull reaches the lower drawbar pull limit.

13. The method of claim 11, further including moving the machine towards the ripping path before lowering the ripper relative to the work surface.

14. The method of claim 11, further including determining a heading of the machine and re-engaging an automated ripping process if the machine is within a second predetermined distance from the ripping path and the heading is aligned with the ripping path.

15. The method of claim 14, wherein the second predetermined distance is less than the predetermined distance.

16. The method of claim 11, further including raising the ripper and moving the machine rearwardly relative to the ripping path upon the machine moving a predetermined distance forward relative to the ripping path and without reaching the ripping path.

17. The method of claim 11, further including determining the maximum steering drawbar pull based upon a coefficient of traction of the work surface.

18. The method of claim 17, further including determining the coefficient of traction of the work surface based upon empirical data in the controller gathered during operation of the machine.

19. A machine comprising:
a prime mover;
a position sensing system associated with the machine for generating data indicative of a position of the machine;
a pair of ground engaging tracks operatively connected to the prime mover for propelling the machine;
a ripper on the machine configured to engage a work surface; and
a controller configured to:
  store a ripping path;
  determine the position of the machine based upon data from the position sensing system;
  compare the position of the machine to the ripping path;
  determine a drawbar pull of the machine;
  determine a maximum steering drawbar pull based upon a steering traction factor, the steering traction factor being within a range of approximately 0.3 to 0.65, the maximum steering drawbar pull being utilized when the machine is being re-oriented relative to the ripping path and being less than a maximum drawbar pull utilized when the machine is being steered in a straight line along the ripping path;
  compare the drawbar pull to the maximum steering drawbar pull;
  raise the ripper relative to the work surface if the machine is positioned greater than a predetermined distance from the ripping path and the drawbar pull exceeds the maximum steering drawbar pull;
  re-orient the machine relative to the ripping path by propelling the pair of ground engaging tracks at different speeds; and
  lower the ripper relative to the work surface.

* * * * *

UNITED STATES PATENT AND TRADEMARK OFFICE
CERTIFICATE OF CORRECTION

PATENT NO. : 9,002,593 B2  
APPLICATION NO. : 13/891865  
DATED : April 7, 2015  
INVENTOR(S) : Clar et al.

Page 1 of 1

It is certified that error appears in the above-identified patent and that said Letters Patent is hereby corrected as shown below:

Specification

Column 10, line 7, delete "fraction" and insert -- traction --.

Column 10, line 16, delete "fraction" and insert -- traction --.

Column 12, line 49, delete "fraction" and insert -- traction --.

Signed and Sealed this
Twenty-second Day of March, 2016

Michelle K. Lee
*Director of the United States Patent and Trademark Office*